May 8, 1956     N. J. PENNING     2,744,865
OZONE GENERATOR
Filed April 5, 1952     2 Sheets-Sheet 1
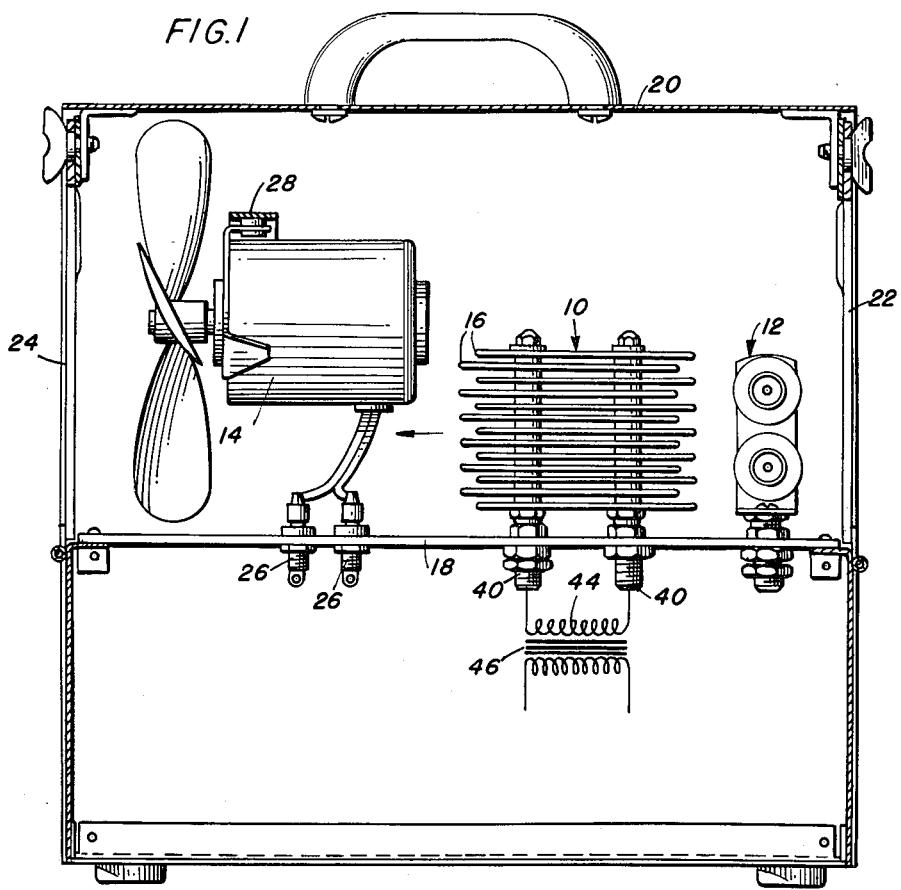
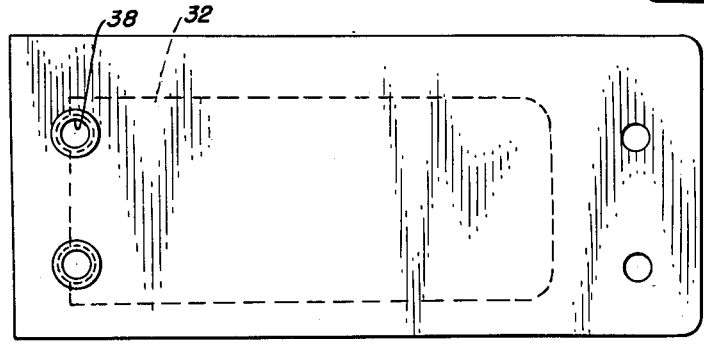
INVENTOR:
NICHOLAS J. PENNING
ATT'Y May 8, 1956 N. J. PENNING 2,744,865
OZONE GENERATOR
Filed April 5, 1952 2 Sheets-Sheet 2
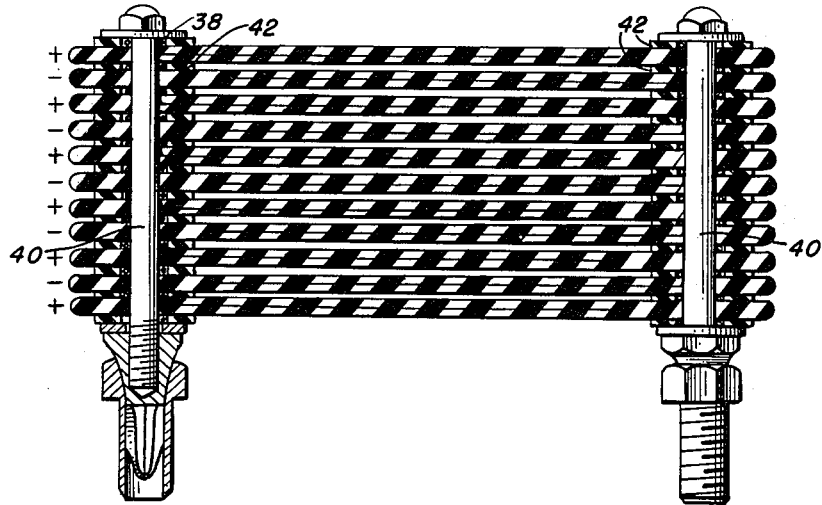
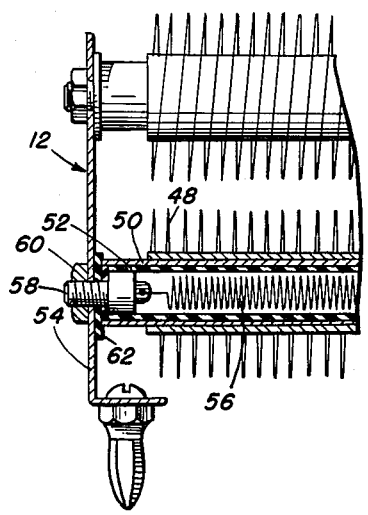
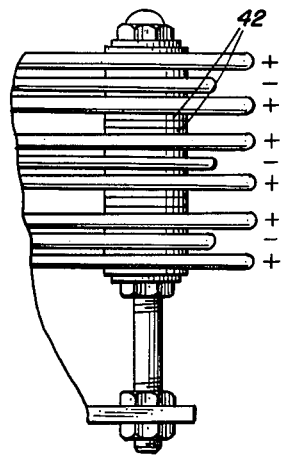
INVENTOR:
NICHOLAS J. PENNING
ATT'Y United States Patent Office 2,744,865
Patented May 8, 1956

2,744,865

OZONE GENERATOR

Nicholas J. Penning, Milwaukee, Wis.

Application April 5, 1952, Serial No. 280,816

12 Claims. (Cl. 204—319)

This invention relates in general to a new and original generator for air purification by controlled production of ultra-violet rays. The action occurs by passing air through a generator comprising a series of parallel plates capable of discharging an ultra-violet electric field. This produces ionized air which is further activated by the electric field as the high speed electrons collide with oxygen molecules of oppositely charted polarity resulting in the union of oxygen molecules with an extra atom or atoms in addition to their usual two atoms. The ozone created by the ultra-violet field being unstable, literally oxidizes all finely divided organic matters it encounters, destroys them, leaving the air clear and pure.

Among the objects of this invention are: to provide plastic generating plates having high dielectric and arc resistance characteristics that will discharge an ultra-violet field at comparatively low temperature in the production of this type of ozone as distinguished from the spark discharger ozone generating machine which produces nitrous oxide ozone which is an impure ozone; to provide means for pulling or pushing air through the generating plates to cool the plates; and to provide a humidity control device to increase the moisture carrying capacity of air passing around and between the generating plates.

Other objects will appear in the specification and will be apparent from the accompanying drawings in which:

Fig. 1 is an end elevation of a plate generator in accordance with this invention combined with a drying device and a fan;

Fig. 2 is a plan view of a single plastic generating plate showing the general shape of the plate and the location and shape of a metal foil conductor therein;

Fig. 3 is an enlarged longitudinal sectional view of the plate taken on the line 3—3 of Fig. 2;

Fig. 4 is an enlarged cross-sectional view of the plate taken on the line 4—4 of Fig. 2;

Fig. 5 is a longitudinal sectional view of a stack of the generating plates taken on line 5—5 of Fig. 1 with intermediate portions of the plates omitted;

Fig. 6 is a fragmentary side elevation of the humidity control device comprising finned heating coils with one of the coils in section, as taken on the line 6—6 of Fig. 1; and Fig. 7 is an end elevation of a generator showing a different staggered arrangement of plates for an intermittent type of generator.

This invention will be described as a generator unit comprised of a plurality of similar unit plates particularly disposed and combined and used in combination with a drier and means for inducing a flow of air around and between the plates for the production of ozone; to the relations and functions of the plates in combination with the other component parts which are responsible for its successful application and use for commercial industrial and home use and for particular application in the office, hospital, theatre, funeral homes, cheese plants, and the like.

The component parts comprising a generator 10, a drier 12 and a fan 14 are mounted preferably in relatively close relation so that air from the drier may be drawn through and around individual plates 16 by the fan which either draws or forces air through the generator. A satisfactory arrangement is shown in Fig. 1 in which the generator is mounted between the drier and the fan upon a common supporting plate 18 which may be located at the bottom of an enclosing casing 20 having an inlet 22 at one end adjacent the drier and an outlet 24 at the opposite end of the casing adjacent the fan. The drier and the generator are mounted upon studs secured to the plate 18 which is made of insulating material, and the fan may also have terminals 26 secured to the plate 18 for providing the electrical connections. The fan itself may be supported by a cross piece 28 suitably secured to opposite sides of the casing 20.

Each generating plate comprises two similar halves 30 of substantially rectangular phenolic sheet material rounded from one side at the edges thereof and enclosing a thin foil 32 of electrical conducting material such as brass, copper or aluminum. These sheets 30 are substantially larger than the foil 32 contained therein so that the sheets extend beyond the foil at all edges. The two opposite sheets may be sealed about the edges by a suitable glue 34 and the sheets molded and united about the edges under suitable temperature and pressure. The foil may also be cast or molded in an enclosing casing which entirely seals the foil therein with a definite thickness of the walls of the sheets entirely enclosing and sealing the foil therein.

As shown more clearly in Fig. 2, the foil is located off center with respect to the plate both longitudinally and transversely and extending through the plate and through the foil at one end are holes 36, two at each end, one pair of which are to engage the foil and the other pair at the other end of the plate are free from engagement with the foil. To conduct the flow of electric current to the foil, one end is beaded over with metal eyelets 38 extending through the holes and clinched at opposite sides of the plate and designated as the positive end of the plate. The holes at the other end are free from any such eyelet and this is designated as the negative end. To assemble a number of individual plates to form a generator, the adjacent plates are placed alternately as to their polarity, that is, the negative end of the plate at one end is interposed between two positive ends and the plates are connected together by bolts 40 inserted through the holes with washers 42 preferably of phenolic material between the plates which accurately space the plates apart. These washers also are sufficient to seat the projecting ends of the eyelets 38 which make connection with the bolts 40. Thus when current is supplied to the bolts 40 at opposite ends of the plates from a secondary winding 44 of the transformer 46, the generator will discharge an ultra-violet field when subjected to a high potential supplied by the secondary winding of the transformer.

For a given set of units in a generator, the intensity of the ultra-violet field is varied in any well known manner as by varying the intensity of the current in the transformer by means of a rheostat (not shown).

An important feature of the generator as thus built up is the staggered relation of the edges of the plates as shown more clearly in Fig. 1 and in Fig. 7, and causes an even distribution of air flow due to this staggered edge condition as the air is drawn or driven in the direction of air flow. The edge failure of the plates, a condition which occurs due to any imperfection of the glue lined between the plates is also prevented by the staggered edges since the air gap between the edges of adjacent generating plates is increased by this staggered effect.

The control device 12 preferably comprises finned heating coils with an aluminum spiral finned tube 48 secured to a copper tubing 50 and with an inner high temperature resistance porcelain tubing 52 disposed between opposite end plates 54. Within the porcelain tubing is a high nickel chromium electrical heat and corrosion resisting alloy helical coil 56 attached to an opposite end terminal 58 at each end, the end terminal extending through the support 54 and secured in place by a nut 60 threaded on the end of the terminal. An insulating washer 62 at each end spaces the support 54 from the copper tubing 50 so that when current is applied to the opposite ends of the heater or control device, a predetermined degree of heat may be applied for drying the air before it is admitted to the generator. To operate the generator assembly, current is simultaneously supplied to the fan, the generator plates, and the drier and air is drawn by the fan through the generator over the drier which increases the moisture carrying capacity of the air as it passes through the generator and therefore lessens the formation of arcing between the generating plates, as moisture has a tendency to create a path arcing across plates under high electrical tension.

Since the electrical discharge between adjacent generator plate is in the ultra-violet wave length, the factors which affect the intensity of discharge are: the dieelectric thickness of the plastic material surrounding and encasing the metallic foils, the voltage applied to the opposite generator terminals, and the thickness of the phenolic washers 42 which act as spacers. The minimum thickness of the washer or spacer must be such that the intensity of the electrical field is uniform throughout and uniform air distribution is maintained through and between the plates in order to dissipate the energy created by constant bombardment of electrons between the plates and the resulting generator temperature maintained preferably at slightly above the room temperature. Instead of mounting plates alternately in each case as shown by Figs. 1 and 5, the adjacent plates may be mounted in different groups as represented in Fig. 7 as three plates mounted alternately as to polarity, each group of three being separated by two or more washers 42 and similarly in any multiples of two, three, four, and the like so as to allow sufficient cooling surfaces where the air velocity is extremely low in a given stack of generating plates. In such a case, the generator might be used with or without a drier.

The general arrangement of a generator and a drying device may be mounted in an air duct without a specifically adjacent fan, if desired, and a blower either with a heating coil or without it may operate directly upon a generator unit. These common arrangements will all be operated with generator plates which are connected alternately to opposite conductors from the source of high potential current supply and with the edges of the generator plates in staggered relation to each other. The unit may be made to discharge horizontally or vertically.

In all of these forms, the generator plates which are connected alternately to opposite conductors from the source of high potential current supply produce a discharge entirely in the ultra-violet wave band depending upon the impressed voltage and by passing air through this ultra-violet field, the result is the production of ozone. By placing the dry air control device in advance of the generator so that air passing therethrough will be drawn between the plates of the generator, the result is an ozone discharge which may be distributed by a fan through a duct or by means of a blower as shown and described.

While the preferred construction of the parts has been described in some detail, it should be regarded by way of illustration and example rather than a restriction or limitation thereof, as many changes in the construction, combination and arrangement of the parts may be made without departing from the spirit and scope of the invention.

We claim:

1. A generating plate for an ozone generating machine, comprising a thin rectangular metallic sheet conductor and a plastic larger rectangular covering sheet material individually hand dielectrically enclosing the sheet conductor therein, the sheet conductor being located in the plastic material in an off center relation relative to the longitudinal and transverse centers of the plate closer to one edge of the plate than at the other.

2. An ozone generating plate, in accordance with claim 1, in which the individually enclosed plate is formed with similarly spaced perforations at opposite ends, the perforations at one end intersecting the sheet conductor and having means extending therethrough to make electric contact therewith, and the perforations at the other end being through the plastic covering free from and beyond the adjacent end of the sheet conductor.

3. A generating plate, in accordance with claim 2, in which the perforations of the sheet conductor are located at the same distances from the center line longitudinally of the sheet conductor and the perforations in the plastic covering material are closer to one edge of the plate than at the other so that the edges of oppositely stacked adjacent plates registering said perforations are staggered.

4. An ozone generator, comprising a plurality of oppositely stacked rectangular plates as set forth in claim 3, having opposite conductor mounting posts in the perforations at opposite ends of the plates and having the plates arranged with the sheet conductors alternately engaging the posts at opposite ends and assembled to produce an alternate staggered relation at both edges of adjacent plates.

5. In an ozone generator, the combination of a plurality of dielectric plates each having a thin rectangular metallic sheet conductor individually tightly enclosed in rectangular dielectric material in an off center relation, means for connecting the plates alternately to opposite poles of a current supply, said plates having holes equally spaced with respect to the longitudinal center of the sheet conductor but eccentric with respect to the longitudinal center of the plate, and the adjacent plates being electrically connected by said means at opposite ends for direct connection with the metallic sheets, both edges of adjacent plates being thus staggered with respect to each other to increase the air gap between adjacent plate edges.

6. In an ozone generator plate, the combination of a rectangular thin metallic sheet conductor and a rectangular covering of plastic material in which the metallic sheet is individually and entirely dielectrically enclosed, the metallic sheet being off center with respect to the longitudinal and transverse center lines of the plate, means forming a conductor extending through the plate at one end in contact with the metallic sheet, and means forming a conductor extending through the other end of the plate and spaced from the end of the metallic sheet conductor so that when adjacent plates are connected at opposite ends for direct contact connection with the metallic sheets, both edges of adjacent plates may be staggered with respect to each other to increase the discharge distances between the adjacent edges.

7. In an ozone generating plate in accordance with claim 2, conductor eyelets applied through the perforations at the end of the plate in contact with one end of the metallic sheet conductor for making electrical connections therewith.

8. In an ozone generating machine, a plurality of plates each comprising a thin rectangular metallic sheet conductor and an individual plastic covering material entirely surrounding and enclosing the sheet conductor therein, the metallic sheet being located closer to one end and to one side of the plate, the plates having holes symmetrical with the sheet conductor at opposite ends, at least one hole at one end passing through the conductor sheet, means extending through the plate and in contact with the conductor sheet for affording current conduction therewith, adjacent plates being disposed oppositely end for end with respect to the metallic sheets which staggers the edges of the plates at both sides thereof, and means for applying current to the current conduction means at opposite ends of the plates.

9. A generator construction, in accordance with claim 8, in which insulated spacing washers are interposed between the individually covered adjacent plates for holding them at predetermined distances apart, and the current conduction means also comprising a fastening means for securing the plates tightly together as well as affording the electrical connection therewith.

10. In an ozone machine, the combination with a plurality of spaced dielectric plates, each having a thin rectangular sheet conductor entirely and separately enclosed therein, each conductor being off center in its plate but having openings at opposite ends of the plate symmetrical with the offset sheet conductor therein, the opening at one end having an electric conductor therein engaging the end of the conductor sheet therein and the opening at the other end of the plate being free from engagement with the conductor sheet, each alternate plate being reversely connected to the conducting posts at the ends of the plate to offset both edges of the plates alternately of each other, a control device for heating air supplied edgewise to the plates, means for supplying electric current to the conductors at opposite ends of the plate, and means for causing a flow of air through the control device and through the generator for causing the flow of ozone therefrom.

11. In an ozone generator, in accordance with claim 8, the combination of means for mounting the generator plates alternately with two plates separated and spaced apart by a plurality of plastic washers at each end and similarly in multiples of a plurality of plates to allow sufficient cooling space between the plates and with the side edges spaced apart where the air velocity is extremely low between a given stack of generating plates.

12. In an ozone generating machine, the combination of a plurality of individual dielectric plates with eccentrically located thin rectangular conductor sheets sealed therein, means symmetrical to the sheets at opposite ends of the plates for engaging one end of the conductor sheet of each plate, means for electrically connecting the ends of the plates in alternate conducting relation to offset edges of adjacent plates from each other and to connect alternate conductor sheets to alternate poles at the ends of the plates, means for inducing a flow of air through the generator edgewise between the plates, and a drier in advance of the generator in the path of air therethrough for maintaining the temperature of the air slightly above that of the room or other enclosure in which the generator is located.

References Cited in the file of this patent

UNITED STATES PATENTS

| | | |
|---|---|---|
| 991,767 | Armstrong | May 9, 1911 |
| 1,162,415 | Steynis | Nov. 30, 1915 |
| 1,396,222 | Lindemann | Nov. 8, 1921 |
| 1,971,513 | Stoddard | Aug. 28, 1934 |
| 2,136,572 | Winkelmann | Nov. 15, 1938 |
| 2,429,152 | Allison | Oct. 14, 1947 |

FOREIGN PATENTS

| | | |
|---|---|---|
| 781,472 | France | Feb. 25, 1935 |
| 198,311 | Great Britain | May 31, 1923 |
| 34,572 | France | Feb. 19, 1928 |